(12) United States Patent
Servutas (10) Patent No.: US 9,854,848 B1
(45) Date of Patent: Jan. 2, 2018

(54) PERSONAL VAPORIZING INHALER WITH ADJUSTABLE AIRWAY

(71) Applicant: Vitali Servutas, Virginia Beach, VA (US)

(72) Inventor: Vitali Servutas, Virginia Beach, VA (US)

( * ) Notice: Subject to any disclaimer, the term of this patent is extended or adjusted under 35 U.S.C. 154(b) by 0 days.

(21) Appl. No.: 15/231,035

(22) Filed: Aug. 8, 2016

(51) Int. Cl.
*A24F 47/00* (2006.01)
*H05B 1/02* (2006.01)
*H05B 3/44* (2006.01)
*F16K 5/04* (2006.01)

(52) U.S. Cl.
CPC ........... *A24F 47/008* (2013.01); *A24F 47/00* (2013.01); *F16K 5/0414* (2013.01); *H05B 1/0297* (2013.01); *H05B 3/44* (2013.01)

(58) Field of Classification Search
CPC .......... A24F 47/00; A24F 47/008; A24F 1/00; A24F 1/22; A24F 1/24; A24D 3/043; A24D 3/062
USPC ......... 131/329, 330, 183, 185, 198.1, 198.2, 131/199, 215.1; 128/200.23, 200.14; 604/186
See application file for complete search history.

(56) References Cited

U.S. PATENT DOCUMENTS

| | | | | |
|---|---|---|---|---|
| 2013/0118484 | A1* | 5/2013 | Ishikita | A61M 16/01 128/200.14 |
| 2016/0183596 | A1* | 6/2016 | Rado | A24F 47/008 392/395 |
| 2016/0270446 | A1* | 9/2016 | Shenkal | A24F 47/008 |
| 2017/0035113 | A1* | 2/2017 | Thorens | A24F 47/008 |
| 2017/0071256 | A1* | 3/2017 | Verleur | H05B 1/0244 |
| 2017/0119981 | A1* | 5/2017 | Davidson | A24F 47/008 |
| 2017/0203058 | A1* | 7/2017 | Davidson | A24F 47/008 |

* cited by examiner

*Primary Examiner* — Chandrika Prasad
(74) *Attorney, Agent, or Firm* — Maier & Maier, PLLC (57) ABSTRACT

A personal vaporizing inhaler having an airway that is adjustable without disassembly of the vaporizer device. Such a vaporizer may include a hollow shell having an opening at one end ending in a mouthpiece, and having at least one air passage in the side of the hollow shell; a rotatable rotary air valve disposed within the hollow shell having an air passage that can be brought into alignment with the air passage of the hollow shell and at least one rotary valve connector, and a build deck having a heating element and at least one build deck connector configured to interface with the rotary valve connector such that rotating the build deck rotates the rotary air valve. The alignment between the air passages of the rotary air valve and the hollow shell may be adjustable in order to allow more or less air into the vaporizer.

10 Claims, 6 Drawing Sheets

PERSONAL VAPORIZING INHALER WITH ADJUSTABLE AIRWAY

BACKGROUND

Personal vaporizing inhalers, or "electronic cigarettes/e-cigarettes," have become an increasingly popular alternative to conventional smoked tobacco products, such as cigarettes or cigars. Vaporizing inhalers can be filled with flavored liquid material ("vape liquid" or "e-juice"), often containing a nicotine product, which may then be heated and vaporized by an atomizer to provide an inhalable dose of the vaporized substance. This inhalable dose can then be inhaled by a user through an end of the vaporizing inhaler. This can produce a physical sensation similar to smoking a conventional smoked tobacco product, effectively simulating a cigarette or cigar, but without producing smoke.

Personal vaporizers can also be used for other purposes other than to dispense a nicotine product. For example, a personal vaporizer may be used in order to aerosolize and dispense another intoxicant or even medication.

Different types of personal vaporizer also exist. For example, a recent innovation in personal vaporizer technology has been the "clearomizer," a personal vaporizing inhaler featuring a transparent tank in which liquid is placed, so that the amount of flavored liquid material that is left in the vaporizing tank can be easily perceived and measured by a user of the vaporizing inhaler.

SUMMARY

An exemplary embodiment of a personal vaporizing inhaler may be disclosed. Such a vaporizer may include: a hollow shell having an opening at the dorsal end, the opening coupled to a mouthpiece, the hollow shell having at least one air passage disposed on a lateral side of the hollow shell; a rotary air valve disposed within the hollow shell and rotatable within the hollow shell, the rotary air valve having at least one air passage disposed on a lateral side of the rotary air valve, the rotary air valve having at least one rotary valve connector, a build deck, the build deck having a heating element, and further having at least one build deck connector configured to interface with the rotary valve connector such that a rotational force applied to the build deck produces a corresponding rotational force in the rotary air valve; and wherein the at least one air passage of the hollow shell and the at least one air passage of the rotary air valve are rotationally alignable, by rotational alignment of the air valve, between an aligned state, a partially aligned state, and a non-aligned state.

An exemplary method of using a personal vaporizing inhaler may also be disclosed. Such a method may include: placing a quantity of liquid material in proximity to the at least one heating element; adjusting, by rotating the build deck such that the placement of the at least one air passage of the rotary air valve is at least partially aligned with the at least one air passage of the hollow shell, the amount of airflow into the hollow shell; vaporizing, with the heating element, a portion of the quantity of liquid material; and extracting the vaporized portion of the quantity of liquid material.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment, and referring generally to the Figures, various exemplary implementations of a personal vaporizing inhaler (or "personal vaporizer," "vaporizing inhaler," "electronic cigarette/e-cigarette," or any other similar term) may be disclosed.

Figure 1A:
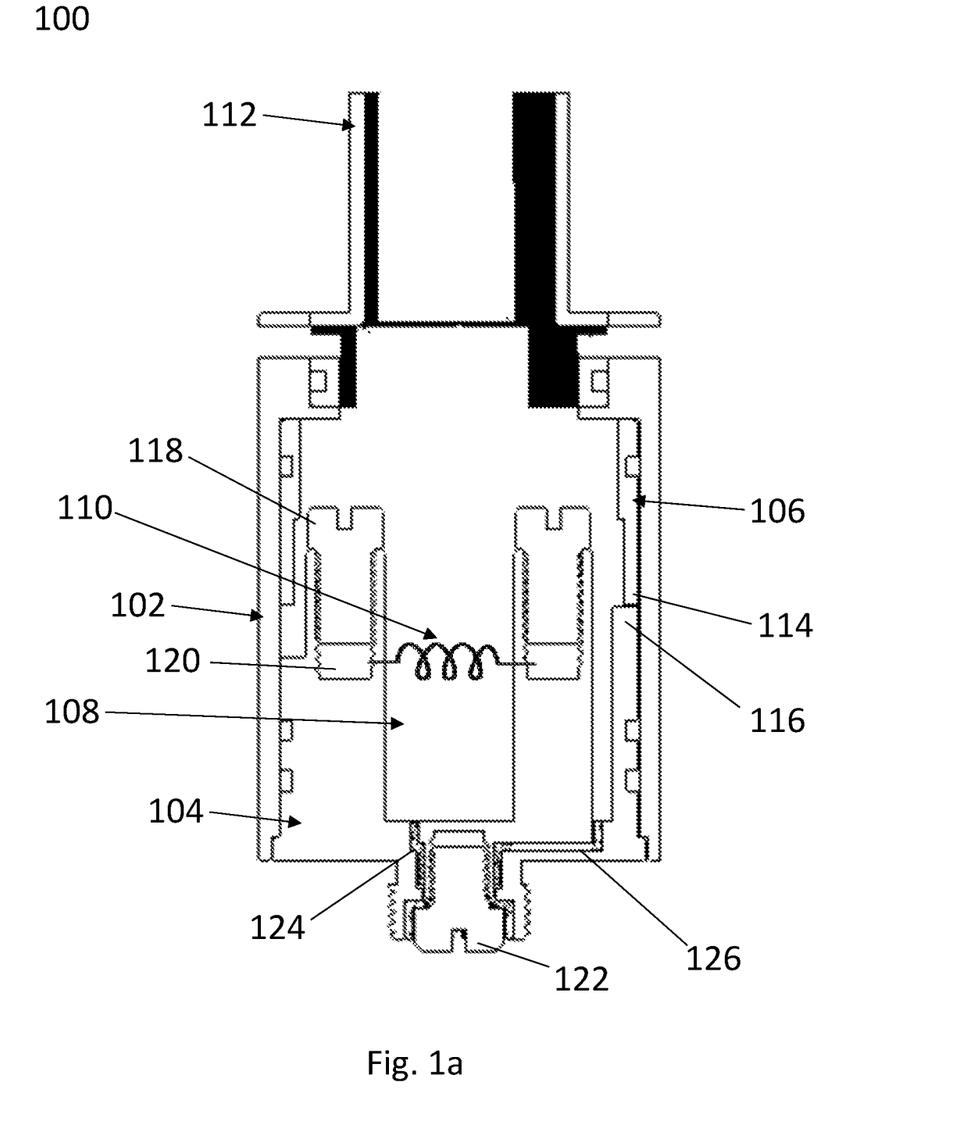
FIG. 1a depicts an exemplary embodiment of a personal vaporizing inhaler.

Turning now to exemplary FIG. 1a, FIG. 1a displays an exemplary embodiment of a personal vaporizing inhaler 100. As shown in FIG. 1a, the personal vaporizing inhaler 100 is a rebuildable dripping atomizer (RDA or "dripper"-type atomizer); however, the term "personal vaporizing inhaler" 100 is not limited to the depicted exemplary configuration of a personal vaporizing inhaler, and may be interpreted to cover other types of personal vaporizing inhaler as well, where applicable.

The depicted rebuildable dripping atomizer may include an outer shell 102 which may enclose a build deck 104 and a rotary air valve 106. Build deck 104 may include a cavity 108 in which flavored liquid material or other vaporizable material may be placed, for example in the form of a cartridge or in the form of liquid-soaked fill material, as desired. The cavity 108 may also include a heating element 110, such as a resistive wire or other resistive heating element, which may be used to heat and vaporize vaporizable material placed in the cavity 108.

The outer shell 102 of the vaporizer 100 may be open on one face and may be connected to a mouthpiece 112. Mouthpiece 112 may be hollow and may allow for airflow in and out of the cavity 108. A user of the vaporizer 100 may be able to breathe in through the mouthpiece when using the vaporizer 100 and thereby inhale vaporized material that has been heated by the heating element 110.

The rotary air valve 106 may have at least one slot 114 which may be sized to accommodate at least one tab 116 disposed on and protruding upward from the build deck 104. In an exemplary embodiment, the build deck 104 may have a single tab 116; in another exemplary embodiment, the build deck 104 may have a plurality of tabs 116, such as two tabs 116 disposed on opposite sides of the build deck 104. In an exemplary embodiment, the tab 116 may interlock with the slot 114 such that when the build deck 104 is radially adjusted, the tab 116 exerts a radial turning force on the slot 114 and causes the rotary air valve 106 to be turned. In other embodiments, the build deck 104 and the rotary air valve 106 may have another connection by which the build deck 104 and the rotary air valve 106 may be rotationally linked; for example, in an exemplary embodiment, a magnetic coupling, a locking catch or clasp, or another such feature may be used instead of or in addition to tab 116 and slot 114.

The build deck 104 may also have a plurality of posts 118, such as at least one positive post 118 and at least one negative post 118, which may be disposed on the build deck 104 facing upward into the outer shell 102 of the vaporizer 100 when the vaporizer 100 is assembled. Posts 118 may be provided with electrical power, for example from a battery attached to a battery connector 122 or from another source, as may be desired. In some embodiments, the post 118 that is the positive post 118 and the post 118 that is the negative post 118 may vary based upon the positioning of the electrical connection; in other embodiments, there may be a dedicated positive post 118 and a dedicated negative post 118, as desired.

According to an exemplary embodiment, each of the plurality of posts 118 may have a hole 120 which may be used to attach a heating element 110 such as a wire; for example, a heating element 110 may be installed between a positive post 118 and a negative post 118 and mounted in the holes 120 in each of the posts 118. A heating element 110 such as a wire may be installed by, for example, loosening a clamping screw located on a post 118 or loosening another clamping element, placing an end of the wire in the hole 120 of one post 118, and then tightening the clamping element to hold the wire in place. In some embodiments, more than two posts 118 may be present, such as a positive post 118 and more than one negative post 118; in such embodiments, one or more of the posts 118, such as the positive post 118, may have a larger hole 120 or may have several holes 120 in which heating elements 110 may be mounted.

Posts 118 may be connected to a battery connector 122, which may be coupled to an external battery to provide the posts 118 with electrical power. In an embodiment, a battery connector 122 may have a first lead extending from a first part of the battery connector 122 to a positive post 118 and a second lead extending from a second part of the battery connector 122 to a negative post 118; these leads may be separated by an insulating gap 124 or by other insulating material. In an embodiment, another insulating gap 126 may be used to isolate the tab 116 or other connector element of the build deck 104.

Figure 1B:
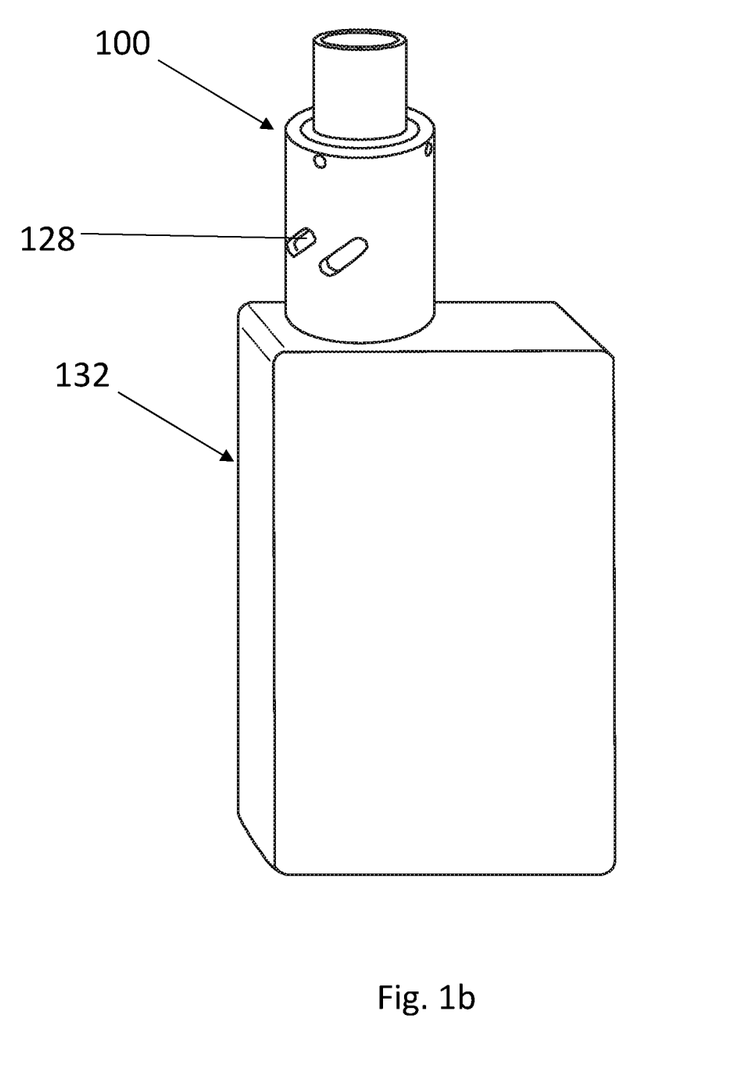
FIG. 1b depicts an exemplary embodiment of a personal vaporizing inhaler coupled to an external battery.

Turning now to exemplary FIG. 1b, FIG. 1b shows an exemplary embodiment of a personal vaporizing inhaler 100 connected to a battery 132. In an exemplary embodiment, the connection between the vaporizer 100 and the battery 132 may be a threaded connection; for example, the battery connector 122 of the vaporizer 100 may be threaded and the battery 132 may have an opening with opposite threading such that the battery connector 122 can be screwed into the opening of the battery having opposite threading. In another exemplary embodiment, another connection between the battery 132 and the vaporizer 100 may be present; for example, the battery 132 and the vaporizer 100 may be coupled magnetically, or with a snap fit, or via any other connection method, as desired. In an exemplary embodiment, a vaporizer 100 may be coupled to a battery 132 such that a conductive part of the battery connector 122 is connected to a conductive component of the battery 132, such that electrical charge stored by the battery 132 may be used to provide electrical power to the posts 118 of the vaporizer 100 or to another vaporizing mechanism of the vaporizer 100, as desired. Battery 132 may also have one or more controls for the vaporizer 100, such as a button or switch that may be used in order to turn on or turn off the vaporizer 100; alternatively, another switch configuration, such as a switch that makes use of differences in electrical resistance to determine when a user has put the vaporizer 100 up to their mouth, may be used instead, as desired.

In an exemplary embodiment, a vaporizer 100 may have one or more air holes 128 that may permit air to flow through the outer shell 102 of the vaporizer. These air holes 128 may be coupled with a rotary air valve 106 of the vaporizer 100 in order to control the level of airflow that is able to flow through the outer shell 102 of the vaporizer 100, as discussed in more detail in the discussion of FIGS. 3a-3b.

Figure 2A:
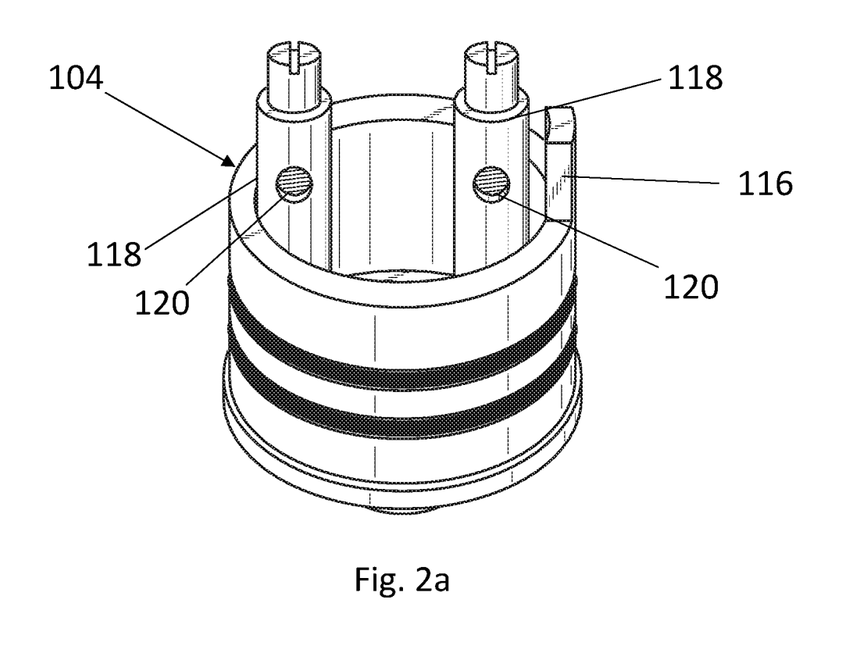
FIG. 2a depicts an exemplary embodiment of an atomizer component of a personal vaporizing inhaler.
Figure 2B:
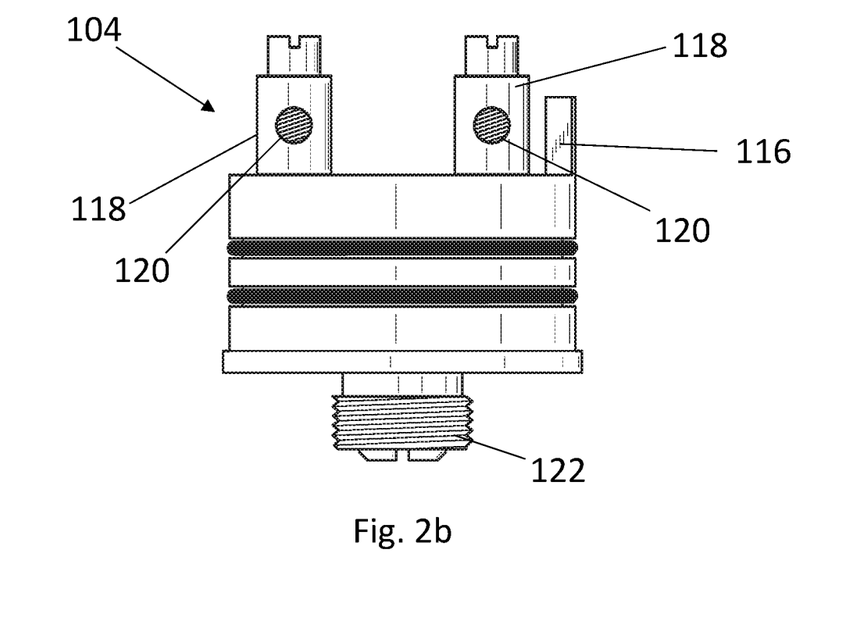
FIG. 2b depicts an exemplary embodiment of an atomizer component of a personal vaporizing inhaler.

Turning now to exemplary FIGS. 2a and 2b, FIGS. 2a and 2b each display an exemplary embodiment of a build deck 104. The build deck 104 may include a plurality of posts 118, each having one or more holes 120 in which a heating element 110 may be placed, and may include a tab 116 or other connector protruding from the build deck 104. Positive and negative posts 118 may be spaced apart by an insulating gap 124 and may each be connected to a battery connector 122.

Figure 3A:
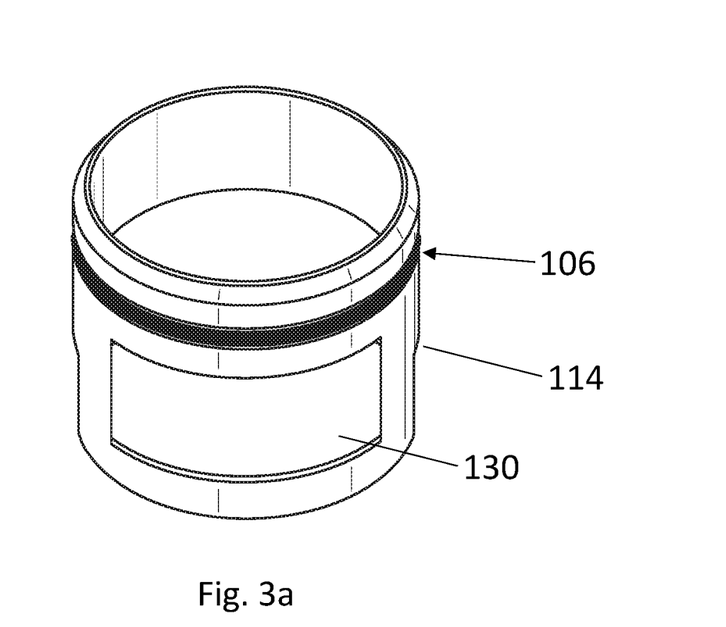
FIG. 3a depicts an exemplary embodiment of a rotary valve component of a personal vaporizing inhaler.
Figure 3B:
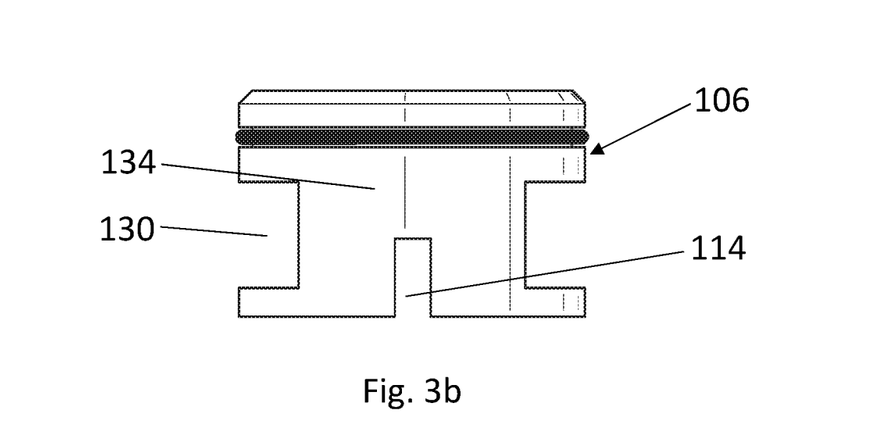
FIG. 3b depicts an exemplary embodiment of a rotary valve component of a personal vaporizing inhaler.

Turning now to exemplary FIGS. 3a and 3b, FIGS. 3a and 3b each display an exemplary embodiment of a rotary air valve 106 that may be located within an outer shell 102. As shown in FIG. 1b, according to an exemplary embodiment, the outer shell 102 may have one or more air holes 128 that may allow air to pass through the outer shell 102 into the inner portion of the vaporizer 100. The rotary air valve 106 may likewise have one or more air holes 130 and one or more solid portions 134 which are not permeable to air or which are less permeable to air than the air holes 130.

The rotary air valve 106 may be placed within the outer shell 102 of the vaporizer 100 such that, when the air holes 128 of the outer shell 102 are aligned with the air holes 130 of the rotary air valve, the overlapping air holes 128, 130 allow air into the inner portion of the outer shell 102. The rotary air valve 106 may further be placed within the outer shell 102 in such a manner that the solid portions 134 of the rotary air valve 106 block the entry of air into the inner portion of the outer shell 102 through the air holes 128 of the outer shell 102 when the air holes 130 of the rotary air valve 106 and the air holes 128 outer shell 102 are not aligned.

In an exemplary embodiment, the rotary air valve 106 may be rotationally adjusted, for example by rotating a build deck 104 to which the rotary air valve 106 is connected, such that a tab 116 of the build deck 104 presses against a slot 114 of the rotary air valve 106. This may cause the air holes 130 of the rotary air valve 106 to become aligned, disaligned, or partially aligned with the air holes 128 in the outer shell 102, which may allow a maximum amount of air, no air, or an amount of air less than the maximum to flow into the inner portion of the outer shell 102 through the air holes 128, 130. This may allow a user of the vaporizer 100 to have some control over the amount of air that enters into the inner portion of the outer shell 102, which may allow, for example, the quantity of flavored liquid material that is vaporized or the temperature of the vaporized material to be adjusted. For example, in an exemplary embodiment, a user may be able to operate a heating element 110 on a higher setting, or install additional heating elements 110 such as additional wires, when there is greater airflow from the airholes 128, 130; this may affect the quantity of liquid that is vaporized.

Various shapes of the outer shell 102 may be contemplated. For example, in an exemplary embodiment, the outer shell 102 may be round, and the rotary air valve 106 may be disposed concentrically within the outer shell 102. In another exemplary embodiment, an internal cavity of the outer shell 102 may be round, even if the outer shell 102 is not, and the rotary air valve 106 may be disposed in this internal cavity. In another exemplary embodiment, the rotary air valve 106 may be disposed within an internal cavity of another shape, if desired; for example, the rotary air valve 106 may be placed as an inscribed circle would be placed. In some embodiments, rotary air valve 106 may be free to rotate or turnable for a full turn; in other embodiments, a rotary air valve 106 may be turnable for less than 360 degrees of rotation, and may be turnable only, for example, from an open state to a closed state.

Figure 4A:
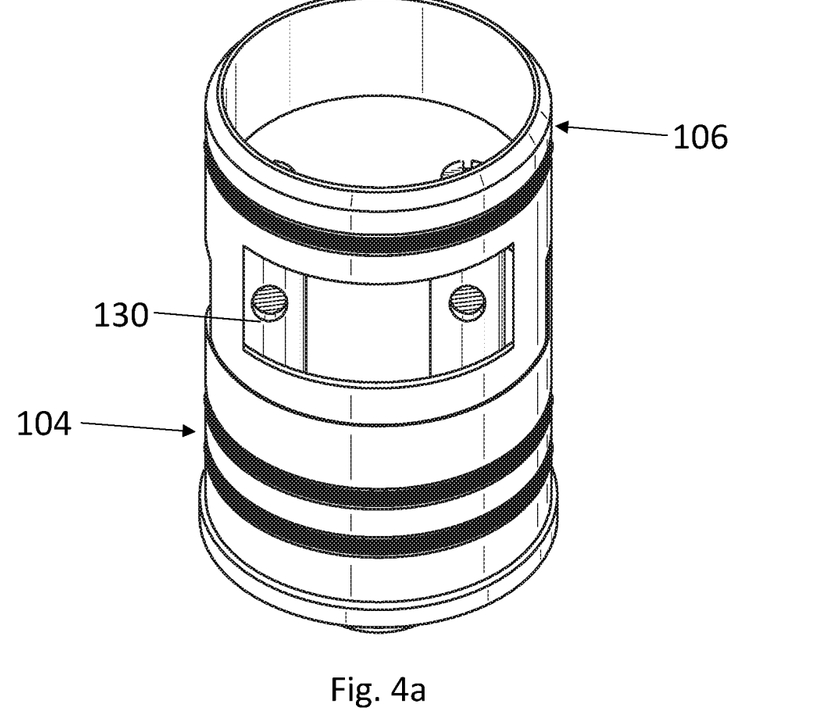
FIG. 4a depicts an exemplary embodiment of an assembly of a rotary valve component and an atomizer component of a personal vaporizing inhaler.
Figure 4B:
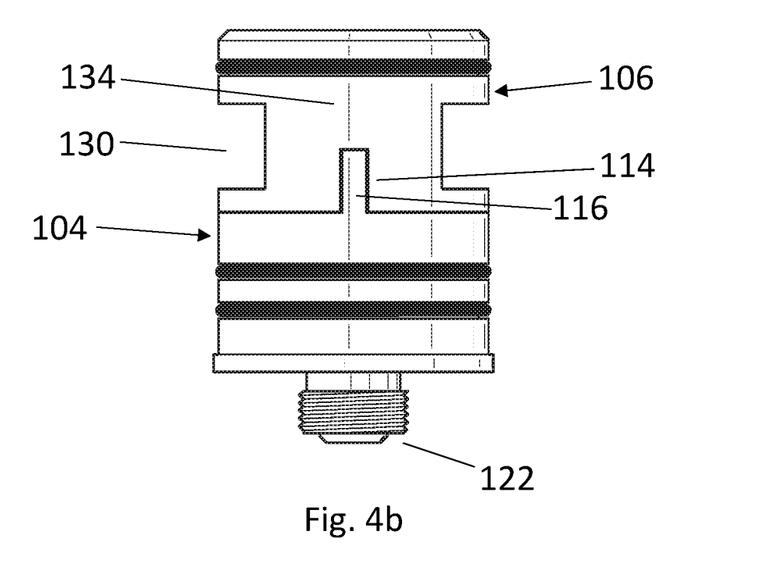
FIG. 4b depicts an exemplary embodiment of an assembly of a rotary valve component and an atomizer component of a personal vaporizing inhaler.

Turning now to exemplary FIGS. 4a-4b, FIGS. 4a-4b each display an assembly of a rotary air valve 106 and a build deck 104. The assembly of the rotary air valve 106 and the build deck 104 may be placed within an outer shell 102, if desired. In an exemplary embodiment, a tab 116 of the build deck 104 and a slot 114 of the rotary air valve 106 may interlock, allowing a user to change the angular position of the rotary air valve 106 by rotating the build deck 104 with respect to the outer shell 102.

Figure 5:
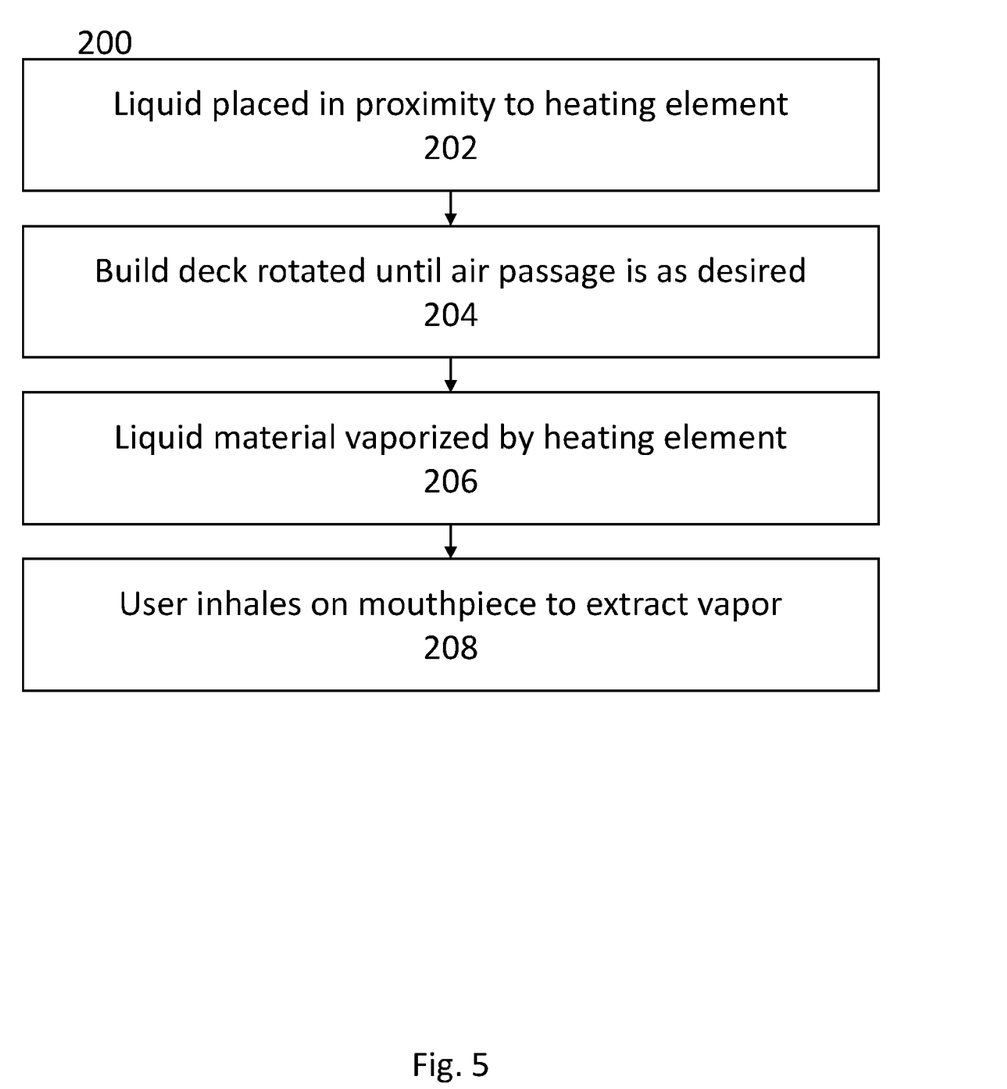
FIG. 5 depicts a flowchart showing an exemplary embodiment of a method of use of a personal vaporizing inhaler.

Turning now to exemplary FIG. 5, a method of use of a personal vaporizing inhaler 100 may also be disclosed. First, in step 202, the flavored liquid material to be vaporized may be placed in proximity to a heating element 110, such as next to a resistive wire. Next, in step 204, the build deck 104 may be rotated, causing consequent rotation in the rotary air valve 106, and shifting an air passage 130 of the rotary air valve 106 to a desirable state with respect to an air passage 128 of the outer shell 102 of the personal vaporizing inhaler 100, such as an aligned state, a partially aligned state, or a non-aligned state. Next, in step 206, the heating element 110 may be activated if necessary (such as by pressing or otherwise activating a switch on an attached battery portion) and the liquid material may be vaporized by the heating element 110. The user may then draw the vaporized liquid material through the mouthpiece 112 of the vaporizer 100, and may continue to use the vaporizer 100 in this way until no longer desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A personal vaporizing inhaler, comprising:
   a hollow shell having an opening at the dorsal end, the opening coupled to a mouthpiece, the hollow shell having at least one air passage disposed on a lateral side of the hollow shell;
   a rotary air valve disposed within the hollow shell and rotatable within the hollow shell, the rotary air valve having at least one air passage disposed on a lateral side of the rotary air valve, the rotary air valve comprising at least one rotary valve connector;
   a build deck, the build deck comprising a heating element, and further comprising at least one build deck connector configured to interface with the rotary valve connector such that a rotational force applied to the build deck produces a corresponding rotational force in the rotary air valve; and
   wherein the at least one air passage of the hollow shell and the at least one air passage of the rotary air valve are rotationally alignable, by rotational alignment of the air valve, between an aligned state, a partially aligned state, and a non-aligned state.

2. The personal vaporizing inhaler of claim 1, wherein the at least one rotary valve connector comprises a slot, and wherein the at least one build deck connector comprises a tab adapted to interface with the slot.

3. The personal vaporizing inhaler of claim 1, wherein the heating element of the build deck comprises at least a first and second post separated by an air gap, and a resistive element connected to the first and the second post and spanning the air gap; and
   wherein the build deck further comprises a battery connector configured to be attached to an external battery, a first electrical lead connected to the first post, and a second electrical lead connected to the second post, wherein the first and the second electrical lead are separated by an insulating gap.

4. The personal vaporizing inhaler of claim 3, further comprising an external battery attached to the battery connector.

5. The personal vaporizing inhaler of claim 1, wherein the rotary air valve is rotatable over a limited span.

6. The personal vaporizing inhaler of claim 1, wherein the rotary air valve is freely rotatable.

7. The personal vaporizing inhaler of claim 1, wherein a hollow inner portion of the hollow shell is round, and wherein the rotary air valve is concentrically disposed within the hollow inner portion of the hollow shell.

8. The personal vaporizing inhaler of claim 1, wherein a hollow inner portion of the hollow shell is a polygonal shape, and wherein the rotary air valve is placed so as to be inscribed within the polygonal shape.

9. A method of using a personalized vaporizing inhaler, the personalized vaporizing inhaler comprising a hollow shell having a mouthpiece and at least one air passage extending through the body of the hollow shell, a rotary air valve having at least one air passage extending through the body of the hollow shell, and a build deck rotatably connected to the rotary air valve and having at least one heating element, the method comprising:
- placing a quantity of liquid material in proximity to the at least one heating element;
- adjusting the amount of airflow into the hollow shell by rotating the build deck such that the placement of the at least one air passage of the rotary air valve is at least partially aligned with the at least one air passage of the hollow shell;
- vaporizing, with the heating element, a portion of the quantity of liquid material; and
- extracting the vaporized portion of the quantity of liquid material.

10. The method of claim 9, wherein the build deck further comprises at least a first and second post separated by an air gap and a resistive element connected to the first and the second post and spanning the air gap; and
- wherein the step of placing a quantity of liquid material in proximity to the at least one heating element further comprises placing the quantity of liquid material within the air gap.

* * * * *